3,527,654
FOAM BACK DRAPERY FABRICS AND METHOD OF MAKING THE SAME

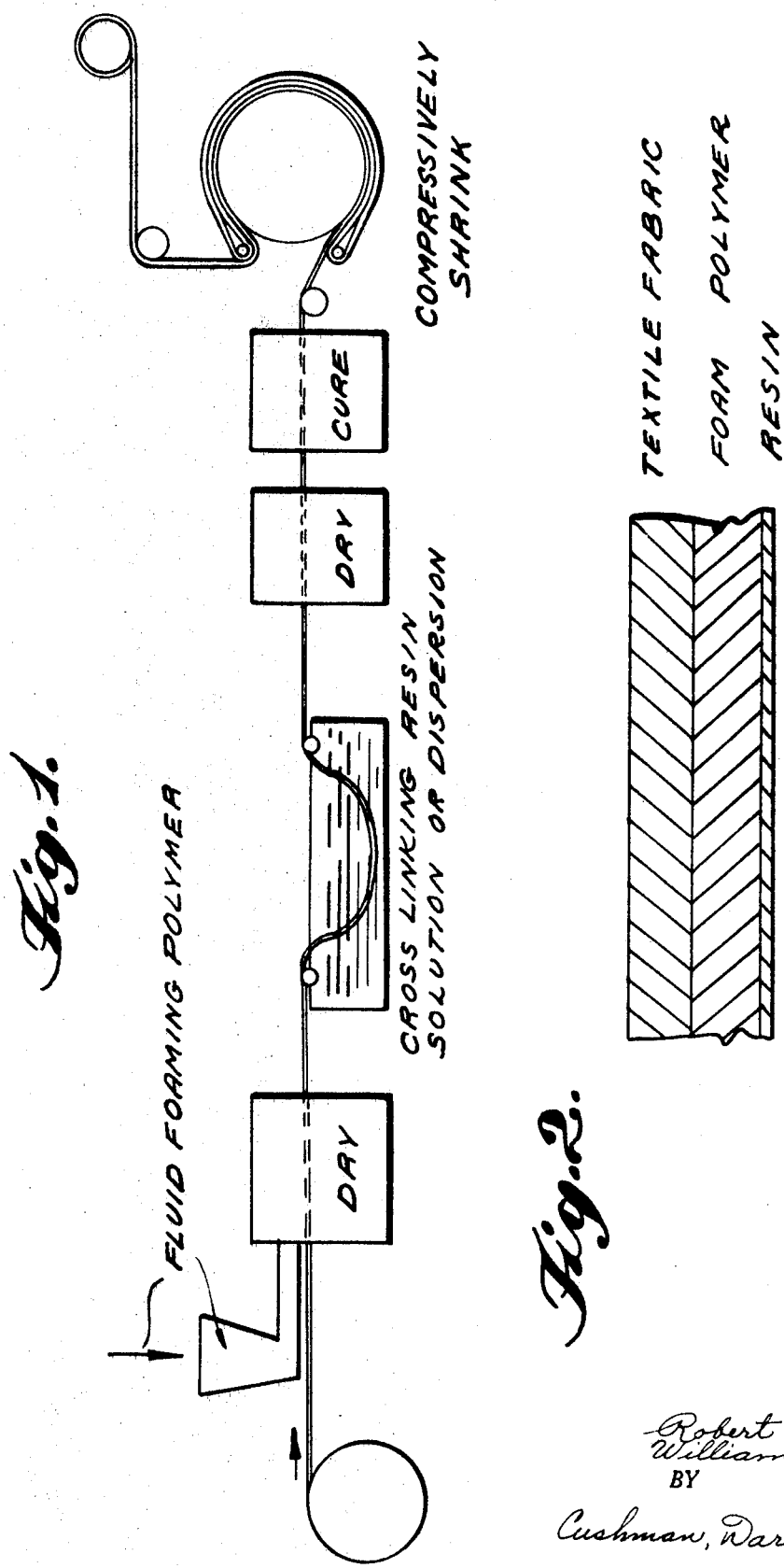

Robert L. Jones, Greensboro, and William A. Brandon, Jr., Burlington, N.C., assignors to Burlington Industries, Inc., Greensboro, N.C., a corporation of Delaware
Filed July 6, 1967, Ser. No. 651,478
Int. Cl. A47h 23/10
U.S. Cl. 117—66                                                                           13 Claims

ABSTRACT OF THE DISCLOSURE

A textile fabric is coated with foamed polymeric composition or formable polymeric composition which foams on the textile. The foamed material, while fluid, flows into intimate contact with the textile and gells. The laminate is impregnated with a cross-linking resin such as aminoplast which is cured to improve crush resistance and other physical properties of the foam. The laminate may be crushed, calendered or embossed prior to curing, the curing preserving the pressed state. The polymeric material may cross-link with the resin and the resin may cross-link the textile. The cured laminate may be compressively shrunk.

DISCLOSURE

The present invention relates to a laminated fabric and more specifically to a fabric composed of a layer of woven, knitted or other textile fabric and a layer of flexible polymeric foam material.

Draperies customarily are made from one or more layers of textile fabric. A typical drapery is a rectangular piece of fabric whose edges are folded back and hemmed. At the top of the drapery, it is customary to provide pleats, which improve the appearance. A drapery made from a single layer of textile material is less expensive than a lined drapery, but it suffers the difficulty that it is not fully opaque and that sunlight can cause fading of dyes. A lined drapery normally is composed of a relatively high quality fabric which is printed or in some other way carries a design, and a lining which is a less expensive plain woven fabric. The lining is turned outwardly, that is, toward the window in front of which the drapery hangs. The lining reduces the amount of light shining through the drapery and the amount of sunlight to which the inner or more expensive layer is exposed. This improves the light fastness of the coloring material in the inner layer. The lining also adds opacity to the drape and makes it more difficult for outsiders to see inside the window. Moreover, the lining improves the heat insulating properties of the drapery by trapping air between it and the outer layers, and it adds weight to the drapery so that it hangs better. However, lined draperies are more expensive because of the cost of the lining fabric and also the cost of sewing it. It previously has been proposed to coat the back of drapery fabrics with solid plastics or synthetic resins such as cross-linked acrylic polymers. However, an adequate thickness of polymer is too heavy and too expensive.

In accordance with the present invention, a drapery is provided which is composed of a textile fabric having a foam polymeric material laminated to and in intimate contact with its reverse side. The foam-laminated fabric is supplied to the drapery manufacturer with the foam in place, so that it can be applied inexpensively to continuous lengths of fabrics during manufacture. This eliminates the need for sewing a lining to the facing fabric when the fabric is converted to a drapery. The drapery and foam lining in laminate form are cut at the same time thus eliminating a separate cutting operation for the lining. The laminate also offers the advantage of not having to have an inventory of lining fabric on hand during the manufacturing operation. The foam increases the opacity of the fabric more effectively than a lightweight lining fabric and possesses all of the other advantages of a lining. In addition, because of its low specific gravity it adds more bulk for a given weight than a lining. Another major advantage of the laminate is that since fabric and the foam are in intimate contact, the product is truly washable and dry cleanable and there is no danger of shrinkage or distortion of the drapery or lining material.

The foam lining is composed of foam material which is applied to the fabric as a fluid or a material which is capable of becoming a fluid during the process so that it can flow into intimate contact with the fabric. After flowing into position, the fluid foam material is gelled, and, if necessary, cured to assume its permanent position in intimate contact with one side of the fabric. However, the foam may be compressed or calendered into a flattened condition after gelling but prior to curing. Also, embossed patterns or crushed effects may be added before the cure step. Thereafter, the laminate is treated with a durable crease cross-linking resin and, if necessary, other finishing agents. The resin is cured, either before or after a drapery is formed, and provides the foam with better recovery when crushed and better durability to washing and dry cleaning. The resin also has an effect on the textile fabric in rendering it more crease-resistant.

If the resin is not cured until after the fabric is made into a drapery, creases imparted before curing become more permanent. However, in accordance with a preferred embodiment of the invention, the resin is cured and the laminate compressively shrunk before the fabric is converted to a drapery.

Substantially any textile fabric can be used for the textile layer of the laminated fabric of this invention. In this regard, the term "textile fabric" includes fabrics which are woven or knitted, as well as nonwoven fabrics composed of randomly arranged fibers, paper-like materials and the various sewn fabrics described in U.S. Pat. 3,030,-786. The fabric may be made of any kind of fibers or filaments including natural fibers such as cotton, wool, sisal, jute, linen and silk; man-made fibers such as regenerated cellulose rayon, polynosic rayon, cellulose esters, e.g. cellulose acetate, cellulose acetate/butyrate and cellulose triacetate, synthetic fibers such as the acrylics, e.g. polyacrylonitrile, modacrylics, e.g. acrylonitrile-vinyl chloride copolymers, polyamides, e.g. polyhexamethylene adipamide (nylon 66), polycaproamide (nylon 6) and polyundecanoamide (nylon 11), polyolefin, e.g. polyethylene and polypropylene, polyester, e.g. polyethylene terephthalate, rubber and synthetic rubber, Saran, glass, etc. The fabric will have a weight of 2 to 16 ounces per square yard although this is subject to variation depending upon the ultimate use.

It will be appreciated that if it is desired that the cross-linking resin used in the invention has an effect on the textile layer as well as on the foam layer, the textile layer must contain at least some cross-linkable fibers or filaments. Fibers, of this type include cellulosic materials such as cotton, linen and rayon. Blends of these fibers with other materials can be used. For example, very satisfactory products can be made from polyester-cotton blends, such as a 60% polyethylene terephthalate-40% cotton blend. Other blends containing a higher proportion of cotton can be used successfully, for example, 85% cotton and 15% polyethylene terephthalate.

The polymeric foam used in the foam layer may be any of those known to the art. The polymer constituting the foam may be rubber, polyurethane, polystyrene, vinyl polymers such as polyvinyl chloride, polyethylene, phenolic resins, silicones and cellulose acetate or others. A very useful material is the cross-linked foamed copolymer of styrene and acrylic acid described in U.S. Pat. 3,215,647. This is formed from a latex containing a copolymer of styrene with another monomer having a reactive group such as acrylic acid. The latex may also contain a coreactive material which cross-links the styrene polymer and which is soluble in water or water-miscible solvents. This invention applies to either foam which is prepared from a latex containing reactive groups on the base polymer of coreactive within the latex itself. This also applies to a latex which may or may not require a reactant or cross-linking material added to the latex during compounding. The latex is foamed or frothed by bubbling in a gas or by decomposition of a gas-releasing material.

Another type of foam useful in the invention is derived from a vinyl plastisol. An extensive discussion of this type of foam is provided in the Plastics Engineering Handbook of the Society of the Plastics Industry, third edition (1960), especially at pages 188–193. In a vinyl plastisol the polymer usually is polyvinyl chloride in the form of small particles, which is intimately mixed with a plasticizer. The plastisols are quite fluid, but, on heating, they gel.

It will be noted that gellation involves a different process in plastisols than in latex foam systems. In the plastisols, gellation is accomplished by heating, which causes the plasticizers to diffuse into the polymer particles. The plasticizer initially establishes a relatively high concentration at the surfaces of the particles, which makes them tacky so that they fuse together into a continuous film. Further heating causes the plasticizer to diffuse through the film and form a smoothly integrated plasticized vinyl film.

As in the case of latex foam, gas may be supplied by mechanically dispersing the gas into the plastisol or by decomposition of a chemical agent such as an azo compound. In the mechanical process, gas is introduced into the chilled plastisol while it is under pressure. In some cases, certain solvent soluble surfactants may be added to the plastisol compound and serve as frothing or foaming agents when gas is injected in the system. Certain silicone surfactants may be used for this purpose. Then the plastisol and dissolved or dispersed gas is extruded through a tube. As the pressure is released, the gas expands to form interconnecting voids. Then the plastisol is gelled by oven heating, e.g., at 360° F.

In the chemical foaming process, a plastisol is mixed with a chemical agent which decomposes when heated. Various agents of this type are available, each having a characteristic decomposition temperature. The agent for any particular system should have a decomposition temperature below the gel temperature of the plastisol. An unfoamed mixture of plastisol and chemical agent is coated onto a fabric and then heated in an oven. The heat in the oven causes the chemical agent to decompose, resulting in foaming, and this is followed by gellation as heating continues.

Similarly, flexible polyurethane foam formulations may be used. These usually are obtained from a polyester or a polyether, a polyisocyanate and water and/or a volatile inert liquid. Foaming is produced with carbon dioxide generated by the polyisocyanate and water or by the evaporation of the volatile inert liquid.

Similarly, other foam systems may be used which provide flexible foams and which are obtained from a polymeric material which either is fluid when applied or becomes fluid during the process.

Various coating techniques may be used to apply fluid foams. These include knife over roll, roller coating, casting, knife over table and doctor blade over table. Since numerous suitable polymer coating techniques already are well known, they need not be described in detail here.

The foams normally contain pigments or dyes which render the fabric opaque and provide an ornamental effect. Opaqueness is provided by the coordinated effect of the foam and the dye or pigment. The foam, having numerous air-polymer interfaces at different angles, scatters light even though the polymer itself may be transparent. Therefore, little or no incident light is transmitted. The light scattering also increases the effectiveness of the dye or pigment. That is, the scattered light, to the extent that it might pass through the foam layer, has an irregular and therefore much longer path through the foam than it would have through an unfoamed mass of polymer having the same thickness. Since the amount of light absorbed increases exponentially with the path length, the effectiveness of the pigments is greatly multiplied.

Almost any dye or pigment may be used which is compatible with the polymer. Certain fillers, such as titanium dioxide, act as pigments and may be added to the foam compound. Fillers also function as extenders and provide opacity. The amount of dye or pigment usually will vary with the effect desired, but ordinarily it will vary from 0% to about 75% by weight of the foam. If chemical foaming agents are used, they should be inert with respect to the dye or pigments, but the selection of suitable materials is considered to be within the skill of the art. It also is possible to print on or emboss the exposed surface of the foam, or crush the foam to produce other ornamental effects.

The durable crease cross-linking resin used in accordance with this invention preferably is an aminoplast, that is, a hardenable aminoplast of the well-known type. This term is used herein to describe hardenable, if desired etherified, carbamide and melamine precondensates which are either water soluble or of limited water solubility and which are obtained in the known manner by the condensation of formaldehyde or other aldehydes or ketones with compounds such as, for example, urea, thiourea, cyanamide, dicyandiamide, cyclic ethylene urea, biguanide, melamine, formamide, formoguanamine, ethyl carbamate, acetoguanamide, triazones, and the like, and mixtures of such compounds, as well as their alkyl and acyl derivatives. Subsequent methylation or other modification of the resulting N-methylol compounds or triazines often is beneficial. Especially good results are obtained by the use of N,N' dimethylol cyclic ethylene urea and various other condensation products of formaldehyde with urea.

"Precondensates of limited but substantial water solubility," in accordance with this invention, are those colloidal intermediates which occur by continuing condensing the product with aldehyde or ketone beyond the crystalline methylol stage. Characteristically, they are prepared from their concentrated aqueous solution by the addition of water. The condensation products of unlimited water solubility, which also may be used in accordance with this invention, are used in the form of aqueous solutions while those of limited water solubility are used either in the form of solutions of the condensation products which have been rendered soluble with the aid of acids, or in the form of dispersions.

The amount of the cross-linking resin used varies with the type of fabric and the use intended. However, about 4–25% by weight of the laminated fabric, including the textile layer and the foam layer, is preferred. Especially good results are obtained when the solids pick-up is about 12%. The aminoplasts or other cross-linking resins are applied from aqueous solutions or dispersions which may include various other materials normally used with them. For example, the material may contain various softeners such as emulsified polyethylene, glycerol monostearate or the like. They may also contain a water repellent silicone, and they also contain a catalyst for curing the cross-linking resin. Typical catalyst or cross-linking agents are formic, hydrochloric or sulfuric acids, maleic anhydride or the like. Other organic or inorganic acids or salts of strong acids with weak bases such as ammonium salts of sulfuric, nitric, oxalic, lactic or other strong inorganic or organic acids, various amine hydrochlorides, or still other acid forming salts such as zinc fluoborate, zinc, nitrate, magnesium chloride as well as Lewis acids such as aluminum chloride can also be used. The catalyst can usefully be added in an amount between about 1 and 10%, preferably about 2-5% based on the weight of resin present in the bath.

When practicing the invention, the textile layer is coated with the foam layer and the foam layer is gelled. The temperature of gellation will depend on the type of foam used, but ordinarily it will be about 250-400° F. The foam may be applied in more than one layer with gelling between coatings, but ordinarily this is not necessary. If the foam requires curing, this also may be accomplished before proceeding to the next stage. However, in accordance with a preferred embodiment of the present invention, in which the foam polymer is the material of the type disclosed in U.S. Pat. 3,215,647, the polymer is not cured at this stage. These materials are capable of cross-linking with themselves, and leaving a few cross-linking sites on the copolymer unreacted. The unreacted site at least at the surface of the foam layer may interact with the aminoplast cross-linking resins. This provides more secure attachment of the foam layer to the aminoplast resin.

The fabric next is treated with the aminoplast either as a solution or dispersion, as described above. Then the fabric is dried, preferably at a temperature of 200-400° F. for about 30 seconds to 5 minutes, and in any event to below the normal moisture content of the textile fabric. Then it is cured. The cure temperature may be as high as 800° F. for a flash cure, but ordinarily is about 200-400° F. for about 30 seconds to 6 minutes. Preferred conditions are about 2 minutes at 340° F. Finally, the fabric is compressively shrunk.

The term compressive shrinkage or compressively shrinking refers to the known process normally used to provide dimensional stability and to prevent further shrinkage during laundering of e.g. woven fabrics. The process is described in detail in the American Cotton Handbook (second edition), 1949, and in prior U.S. patents such as 1,861,422, 1,861,423, 1,861,424, 1,944,001, 2,078,528, 2,082,981, 2,084,367, 2,450,022 and 2,721,370. In this process, the fabric is passed through an apparatus known as a compressive shrinkage range. In one form of apparatus used in the process, a thick blanket is passed over a relatively small diameter roller and then around a large drum. The path of the blanket is S-shaped so that one surface of the blanket is turned out as the blanket passes over the small roller and then turned in to lie against the drum. The blanket may be, for example, a thick pile fabric. At is passes over the small roller, the outer edges of the tufts of the blanket are spread apart. Then, as it turns against the drum, the tips of the tufts come back together again. The fabric which is to be compressively shrunk is laid on the blanket when the tufts are spread apart. As the tufts come together again, the fabric is caused to shrink to conform to the reduced surface area of the outer face of the blanket. The fabric at this point is against the drum, and therefore cannot buckle, consequently, there is a kind of mechanical compression of the fabric in the machine direction which has the effect of mechanically-induced shrinkage. On a microscopic scale, this is accomplished by rearranging the fibers in the fabric.

Of course other types of apparatus for compressively shrinking fabrics may be used. In all cases, the fabric is compressed in the machine direction while constrained against buckling.

Ordinarily, the fabric is moisturized before insertion in the compressive shrinkage apparatus, to permit the fibers to rearrange more easily and a heated shoe may be laid over the small diameter roller referred to above. In most cases the fabric is passed through two compressive shrinkage machines, with invention of the fabric between them. The reason for this is that the fabric is ironed when it contacts the heated drum. By inverting the fabric between passes, both surfaces of the fabric are ironed.

The amount of shrinkage which can be produced in a shrinkage range can be adjusted by varying the tension of the blanket and the relative speed of the blanket and the large diameter drum. In the present invention, the degree of shrinkage normally is about ½ to 4%.

The order of steps described above is particularly preferred. If the fabric is compressively shrunk before the foam material is applied, the shrinkage will come out during coating of the foam material. This is due to the tension applied to the fabric during the foam application and the slight wetting out of the fabric from the water present in the foam compound. Furthermore, the compressive shrinkage has desirable effects on the foam itself. If the cross-linking resin is applied to the fabric before the foam, so that it is applied only to the textile material and not to the foam layer, the foam will not have the benefit of the resin. The resin improves the recovery of the foam when depressed and gives it better durability to washing and dry cleaning. In the case of crushed or embossed foam, the resin treatment improves the durability of the desired flattened appearance and also improves the stability to multiple launderings. Also, if the foam were not treated with resin, it would set with wrinkles and the like when the fabric is rolled up. Compressive shrinkage of the foam before the resin treatment, rather than after compressive shrinkage in accordance with the preferred mode of operation, results in greater working loss and less controlled shrinkage.

The completed fabric can receive other treatments. For example, the fabric can be treated with the soil release coating described in the application of Hinton et al., Ser. No. 604,649, filed Dec. 27, 1966, or it may receive other treatments. This treatment also can be applied to the fabric at an earlier stage, for example, before compressive shrinkage, but after the cross-linking resin has been cured.

The following examples illustrate the practice of the invention.

EXAMPLE 1

A woven fabric comprised of yarn containing 60% polyethylene terephthalate and 40% cotton fibers and having a weight of 6 ounces per square yard was coated with the foam described in Example 1 of U.S. Pat. 3,215,647. This contains a copolymer derived from 30 parts styrene, 60 parts 1,3-butadiene and 10 parts acrylic acid and a cross-linking system comprising super Amide B-5, a coconut fatty acid diethanol amine condensate, and a water-soluble melamine-formaldehyde resin as well as sufficient water so that the solids content is 42%. Small amounts of talc, titanium dioxide and zinc oxide were added as pigments and to reduce tackiness. The latex was mechanically foamed to a gas content of 75% by volume and flowed onto the fabric. Then the fabric is placed in an oven which was maintained at about 385° F. This caused the latex to gel. The dry solids pick-up corresponded to about 3 ounces per square yard. The foam had density of about 6 pounds per cubic foot and formed a layer approximately 20 mil thick. Then the laminate was padded to a 12% solids pick-up in an aqueous liquid containing N,N'-bis-dimethylol-ethylene urea 10% solids by weight, emulsified polyethylene wax 1% by weight solids, glycerol monostearate 1% by weight solids, methyl hydrogen polysiloxane 1% by weight solids, and 1% by weight solids of a catalyst containing in about 6:1 ratio zinc nitrate and isopropylamine hydrochloride, balance water. The fabric was dried for 2 minutes in an oven maintained at about 340° F. and then was cured for 2 minutes in an oven maintained at 340° F. Then the fabric was washed in water containing sufficient sodium perborate to adjust the pH to the range of about 7.5 and with about .2% nonionic detergent. The fabric was squeezed to remove excess water and compressively shrunk on a 2 drum double palmer with the shrinkage set at 2% and the drum temperature 280° F. The fabric then could be sewed into draperies, for example by the method disclosed in U.S. patent application of Farrel No. 600,193 filed Dec. 8, 1966.

Example 2

A woven fabric of which the warp portion consisted of 100% continuous filament rayon and the filling portion composed of 100% cotton and having a weight of 7.25 ounce per square yard was coated with a foam prepared from the latex described in Example 2 of U.S. Pat. 3,215,647. This contains 74.6 parts vinyl chloride, 24.9 parts of vinylidene chloride and 0.5 part of 2-sulfoethyl methacrylate. To 100 parts of latex solids was added 7 parts sodium lauryl sulfate, 40 parts dioctyl phthlate, 40 parts butyl benzyl phthlate, 5 parts melamine formaldehyde resin, 15 parts titanium dioxide, 40 parts calcium carbonate and .30 part methyl cellulose.

The latex compound was mechanically foamed to a gas content of 65% volume and flowed onto the fabric. The fabric was placed in an oven maintained at 350° F. This caused the foam to fuse and gel. The dry solids of foam applied was 5 ounces per square yard. Foam density was about 13 pounds per cubic foot and approximately 35 mils thick. The laminate was then embossed by placing a wire cloth screen over the foam and placing between the plates of a hydraulic press and applying sufficient pressure to obtain a patterned effect.

The laminate was then removed from the press and then padded with an aminoplast resin system, cured and compressively shrunk as described in Example 1.

Example 3

A 100% fiberglass drapery fabric weighing 5 ounces per square yard was coated with an open cell, mechanically blown polyvinyl chloride foam. The plastisol for the foam consisted of 100 parts plastisol grade polyvinyl chloride resin, 95 parts octydecyl phthalate, 5 parts epoxy plasticizer, 3 parts barium-cadmium-zinc stabilizer, 15.4 parts titanium dioxide and 12 parts silicone surfactant such as Dow Corning DC-XR-6-3701. The plastisol viscosity was 3000 cps.

The plastisol was fed into a mechanical foamer and air flow adjusted to give a foam density of 15-18 pounds per cubic foot. Foam was applied at levels of 5 to 35 mils in thickness. Drying and curing were accomplished by heating for six minutes in a forced air oven set at 325° F.

The fabric coated with this foam showed good drape and resiliency and a noticeable improvement in physical properties such as tear strength and yarn slippage. Similar results were obtained when this example was repeated with the fabric described in Example 2.

In making drapes from finished goods according to this invention, the procedure used may be that described in Farrel application Ser. No. 600,193 filed Dec. 8, 1966, especially with respect to FIGS. 6-13 thereof. Briefly, a continuous length of the finished drapery fabric is taken from its roll or other package and is continuously folded and then sewed with a hem, first along one side edge and then along the other side edge, or along both side edges simultaneously. The hemmed length is then cut transversely into predetermined shorter lengths, each of which will be subsequently converted into a drapery panel. The cut segments allow sufficient material for top and bottom hems, so that, after folding and hemming, the finished drape will be of the desired length. The cutting operation may be performed automatically as the fabric is run out of the hemming operation, or it may be performed subsequently on a batch basis.

Next, the lower edge portion of the cut drapery length is accurately creased so as to form two transverse fold lines preparatory to forming a bottom hem. One fold line may be two inches above the bottom edge, and the next fold line may be four inches above the two inch fold line. The creasing operation is carried out by suitable equipment adapted to perform this function. The two inch fold hides the cut edge, and the four inch fold provides a neat hem, with sufficient fabric to permit any subsequent consumer adjustments.

Each hem is transversely machine stitched. The previously-mentioned creasing operation facilitates the folding steps so that the hems can be formed rapidly and accurately.

Next, a strip of stiffening material such as buckram binding may be secured to the top edge of the cut drapery length. This is accomplished by first placing the lower edge portion of the buckram or other strip over the upper edge portion of the cut drapery length and stitching the two layers together. The buckram strip is then folded along its lower edge so as to place the previously exposed surface of the buckram strip against the drapery fabric.

The cut drapery length is then turned over, and the top hem, defined by the buckram or other stiffening strip and a portion of the drapery fabric, can be pleated in any convenient manner. Commercially, this may be done by first feeding the top hem portion into an automatic pleat crimping apparatus which presses a plurality of spaced-apart, three-fold pleats into the heading, followed by sewing to hold the pleats, or by sewing and "fastening" as in Farrell application, Ser. No. 600,193 filed Dec. 8, 1966, using the pleat retainer thereof. Typically, the folds of the finished pleat are not sewed, inasmuch as this would flatten the outermost pleat portions, and render them immobile. Style and fashion currently demand a folded but not a flattened appearance.

In the drawing,

FIG. 1 is a schematic flow diagram illustrating the steps of the process, and

FIG. 2 is a cross-section showing the fabric produced.

In the above description, reference has been made to certain prior U.S. patents and pending U.S. patent applications. The disclosure of each of them is incorporated herein by reference, to avoid the need to reproduce them in this disclosure. It will be appreciated that various changes may be made in detail regarding the materials, processes and products described herein without departing from the invention as defined in the appended claims. Similarly, it will be understood that, while the fabrics are especially useful for draperies, they also are well suited for slipcovers, upholstery, tablecloths and wallcoverings.

What is claimed is:

1. A process for manufacturing a foam-laminated fabric useful for draperies, slipcovers, upholsteries, tablecloths, wallcovering and the like, comprising:
   applying to one side of a textile fabric a foamed or foamable polymeric material,
   flowing foamed polymeric compositions while fluid into intimate contact with said textile fabric, and gelling the foamed polymeric composition,
   applying to the textile fabric and the gelled foamed polymeric composition a cross-linkable resin,
   and thereafter heating the foam-coated textile fabric to cure said resin,
   whereby said foam has improved resistance to crushing and laundering.

2. A process as set forth in claim 1 in which said resin is an aminoplast.

3. A process as set forth in claim 1 in which the polymeric composition applied to one side of the textile fabric is an unfoamed plastisol of polyvinyl chloride containing a chemical foaming agent which releases gas or heating, and the polymeric composition is thereafter foamed by heating to decompose said agent before the plastisol is gelled.

4. A process as set forth in claim 1 in which the polymeric composition applied is a mechanically-foamed aqueous latex of a cross-linkable styrene copolymer containing a cross-linking agent, said copolymer also being chemically bonded to said cross-linkable resin.

5. A process as set forth in claim 1 including compressively shrinking the laminated fabric after it has been cured, the cured resin providing controlled shrinkage.

6. A process as set forth in claim 1 in which the polymeric composition applied to one side of the textile fabric is a foamed plastisol of polyvinyl chloride containing a surfactant type chemical agent which acts as a foaming or frothing agent when air is mechanically injected in the plastisol.

7. A laminated textile comprising a textile fabric layer and a foamed polymer layer in intimate contact with one side of said textile fabric layer, the fabric layer and the foamed polymer layer being impregnated with cured cross-linked resin which improves the resistance of said foam to crushing and laundering.

8. A laminated fabric as set forth in claim 7 in which said cross-linked resin is an aminoplast.

9. A laminated fabric as set forth in claim 7 in which said polymer is plasticized polyvinyl chloride.

10. A laminated fabric as set forth in claim 7 in which said polymer is cross-linked styrene copolymer.

11. A laminated fabric as set forth in claim 7 in which the amount of said cross-linked resin is 4–25% by weight of the textile layer and the foamed polymer.

12. A laminated fabric comprising a textile fabric layer and a compressed or embossed foamed polymer layer in intimate contact with one side of said textile fabric layer, the fabric layer and the foamed polymer layer being impregnated with cured cross-linked resin which improves the resistance of said foam to crushing and laundering.

13. A self-lined drapery fabric comprising the laminated textile of claim 12 hemmed at top, bottom and side edges, the top edge being formed into a reinforced pleated configuration.

References Cited

UNITED STATES PATENTS

| 2,567,951 | 9/1951 | Lewis | 161—160 X |
| 2,721,370 | 10/1955 | Cluett et al. | 26—18.6 |
| 3,070,476 | 12/1962 | Miller. | |
| 3,173,150 | 3/1965 | Mohler. | |
| 3,196,062 | 7/1965 | Kristal. | |
| 3,215,647 | 11/1965 | Dunn. | |
| 3,232,786 | 2/1966 | Kellman | 117—98 |
| 3,262,805 | 7/1966 | Aoki. | |
| 3,311,575 | 3/1967 | Graham | 260—2.5 |
| 3,399,714 | 9/1968 | Farrell | 160—348 |

RALPH S. KENDALL, Primary Examiner

U.S. Cl. X.R.

117—76, 161; 160—348